US009606506B2

(12) United States Patent
Large et al.

(10) Patent No.: US 9,606,506 B2
(45) Date of Patent: Mar. 28, 2017

(54) HOLOGRAPHIC INTERACTION DEVICE

(71) Applicant: Microsoft Technology Licensing, LLC, Redmond, WA (US)

(72) Inventors: Timothy Andrew Large, Bellevue, WA (US); Neil Emerton, Cambridge (GB); Moshe R. Lutz, Bellevue, WA (US); Vivek Pradeep, Snohomish, WA (US); John G. A. Weiss, Lake Forest Park, WA (US); Quintus Travis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 14/053,801

(22) Filed: Oct. 15, 2013

(65) Prior Publication Data

US 2015/0103011 A1    Apr. 16, 2015

(51) Int. Cl.
| | | |
|---|---|---|
| *G03H 1/00* | (2006.01) | |
| *G06F 3/023* | (2006.01) | |
| *G06F 3/0488* | (2013.01) | |
| *G06F 3/01* | (2006.01) | |
| *G06F 3/0481* | (2013.01) | |
| *G03H 1/04* | (2006.01) | |

(Continued)

(52) U.S. Cl.
CPC ........... *G03H 1/0005* (2013.01); *G06F 3/011* (2013.01); *G06F 3/023* (2013.01); *G06F 3/04815* (2013.01); *G06F 3/04883* (2013.01); *G06F 3/04886* (2013.01); *G03H 2001/0061* (2013.01); *G03H 2001/0441* (2013.01); *G03H 2001/2284* (2013.01); *G03H 2001/266* (2013.01); *G03H 2001/2615* (2013.01); *G03H 2227/02* (2013.01); *G03H 2227/05* (2013.01)

(58) Field of Classification Search
None
See application file for complete search history.

(56) References Cited

U.S. PATENT DOCUMENTS

| | | | | |
|---|---|---|---|---|
| 7,054,045 | B2 * | 5/2006 | McPheters et al. | 359/15 |
| 7,881,901 | B2 | 2/2011 | Fein et al. | |
| 9,256,323 | B2 * | 2/2016 | Kim | H04M 1/0272 |

(Continued)

FOREIGN PATENT DOCUMENTS

| | | |
|---|---|---|
| WO | WO-0193182 | 12/2001 |
| WO | WO-2013032076 | 3/2013 |

OTHER PUBLICATIONS

"Honeycomb Android Developers", Retrieved from: <http://developer.android.com/about/versions/android-3.0-highlights.html> on Aug. 14, 2013, (Jun. 23, 2012), 5 pages.

(Continued)

*Primary Examiner* — Kenneth B Lee, Jr.

(57) ABSTRACT

A holographic interaction device is described. In one or more implementations, an input device includes an input portion comprising a plurality of controls that are configured to generate signals to be processed as inputs by a computing device that is communicatively coupled to the controls. The input device also includes a holographic recording mechanism disposed over a surface of the input portion, the holographic recording mechanism is configured to output a hologram in response to receipt of light, from a light source, that is viewable by a user over the input portion.

20 Claims, 7 Drawing Sheets

(51) Int. Cl.
G03H 1/22 (2006.01)
G03H 1/26 (2006.01)

(56) References Cited

U.S. PATENT DOCUMENTS

| | | | | |
|---|---|---|---|---|
| 2006/0230657 A1* | 10/2006 | Kotze | ............. | G03B 25/02 |
| | | | | 40/454 |
| 2009/0109175 A1 | 4/2009 | Fein et al. | | |
| 2009/0197749 A1* | 8/2009 | Merkel | ............. | A43B 3/00 |
| | | | | 482/148 |
| 2010/0208313 A1* | 8/2010 | Horgan | ............. | G03H 1/0005 |
| | | | | 359/2 |
| 2013/0082978 A1 | 4/2013 | Horvitz et al. | | |
| 2013/0187950 A1* | 7/2013 | Nowatzyk | ............. | G09G 3/003 |
| | | | | 345/633 |

OTHER PUBLICATIONS

"Microsoft Research: HoloDesk—Direct 3D Interactions (Holographic Windows Phones)", Retrieved from : <http://www.wp7connect.com/2011/10/21/microsoft-research-holodesk-direct-3d-interactions-holodraphic-windows-phones/> on Aug. 14, 2013 (Oct. 21, 2011), 10 pages.

"zSpace: Transforming Ordinary PCs Into Powerful Holographic Workstations", Retrieved from: <http://www.wp7connect.com/2011/10/21/microsoft-research-holodesk-direct-3d-interactions-holodraphic-windows-phones/> on Aug. 14, 2013, (Jun. 1, 2013), 4 pages.

Darling, Patrick "Intel and Nokia Create First Joint Laboratory", Retrieved from <http://newsroom.intel.com/community/intel_newsroom/blog/2010/08/23/intel-and-nokia-create-first-joint-laboratory> on Aug. 14, 2013, (Aug. 23, 2010), 2 pages.

Gobbo, Ivan et al., "Holographical User Interface", Retrieved from: <http://www.apimac.com/research/2005/03/30/holodraphical-user-interface/> on Aug. 14, 2013, (Mar. 30, 2005), 4 pages.

"International Search Report and Written Opinion", Application No. PCT/US2014/059791, Feb. 5, 2015, 12 Pages.

"Second Written Opinion", Application No. PCT/US2014/059791, Sep. 29, 2015, 6 pages.

"International Preliminary Report on Patentability", Application No. PCT/US2014/059791, Feb. 3, 2016, 8 pages.

* cited by examiner

HOLOGRAPHIC INTERACTION DEVICE

BACKGROUND

The ways in which users may interact with a computing device continues to expand. For example, users initially interacted with computing devices using a keyboard. Cursor control devices were then introduced (e.g., a mouse) to support interaction with a graphic user interface.

A recent example of this expansion involves gestures. Gestures may be input in a variety of ways, such as detection of motion made by one or more fingers of one or more hands of a user by touchscreen or other functionality. However, gestures may suffer from a problem in that a user may not be made aware of what gestures are supported by the device. In other words, a user may be faced with having to "guess what to do" in order to engage in such interaction, which may be frustrating and limit the amount of functionality that is available to a user of the device.

SUMMARY

A holographic interaction device is described. In one or more implementations, an input device includes an input portion comprising a plurality of controls that are configured to generate signals to be processed as inputs by a computing device that is communicatively coupled to the controls. The input device also includes a holographic recording mechanism disposed over a surface of the input portion. The holographic recording mechanism is configured to output a hologram in response to receipt of light, from a light source, that is viewable by a user over the input portion.

In one or more implementations, a hologram is caused to be displayed by a computing device, the hologram indicating how one or more gestures are to be performed by a user to interact with the computing device. The one or more gestures are recognized by the computing device from an input detected using one or more sensors of the computing device. Responsive to this recognition, performance of one or more operations is initiated by the computing device that correspond to the recognized one or more gestures, respectively.

In one or more implementations, a system includes an input device having an input portion comprising a plurality of controls that are configured to generate signals and a holographic recording mechanism disposed over a surface of the input device. The system also includes a computing device that is communicatively coupled to the input device to receive and process the generated signals as inputs, the computing device including a light source configured to cause the holographic recording mechanism to expose a hologram that is viewable by a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Gestures have been developed to increase the ways in which a user may interact with a device. However, due to their very nature is may be difficult for a user to determine which operations are available to be initiated by a gesture, how to perform the gesture, and so on. Consequently, functionality made available via a gesture may be missed by a user using conventional techniques.

A holographic interaction device is described. In one or more implementations, an input device is configured to include a holographic recording mechanism that may be utilized to indicate available functionality of the computing device through use of a hologram, such as to indicate gestures that may be supported by the device. For example, a holographic recording mechanism may be disposed over an input device, such as a thin film secured over one or more keys of a pressure sensitive keyboard. A light source may then be positioned (e.g., a laser included as part of the computing device) such that light emitted by the source on the holographic recording mechanism causes a hologram to be displayed above the input device.

The hologram may be configured to indicate gestures that are available for recognition by the computing device, such as part of a near-field user interface (NUI, also referred to as a natural user interface) that does not involve contact with a surface through detection using one or more sensors, such as an image sensor, long range capacitive sensor, and so on. The hologram, for instance, may be configured as a display of a navigation control. Movement of one or more fingers of a user's hand in relation the displayed hologram may then be recognized as gestures involving navigation. In this way, a user may be readily informed as to a range of gestures that are available for interaction with a computing device, further examples of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Further, although an input device is described, other devices are also contemplated that do not include input functionality, such as covers. For example, these techniques are equally applicable to passive devices, e.g., a cover having one or more materials (e.g., a holographic recording mechanism) that are configured and positioned within the cover and so on as further described below.

Example Environment

Figure 1:
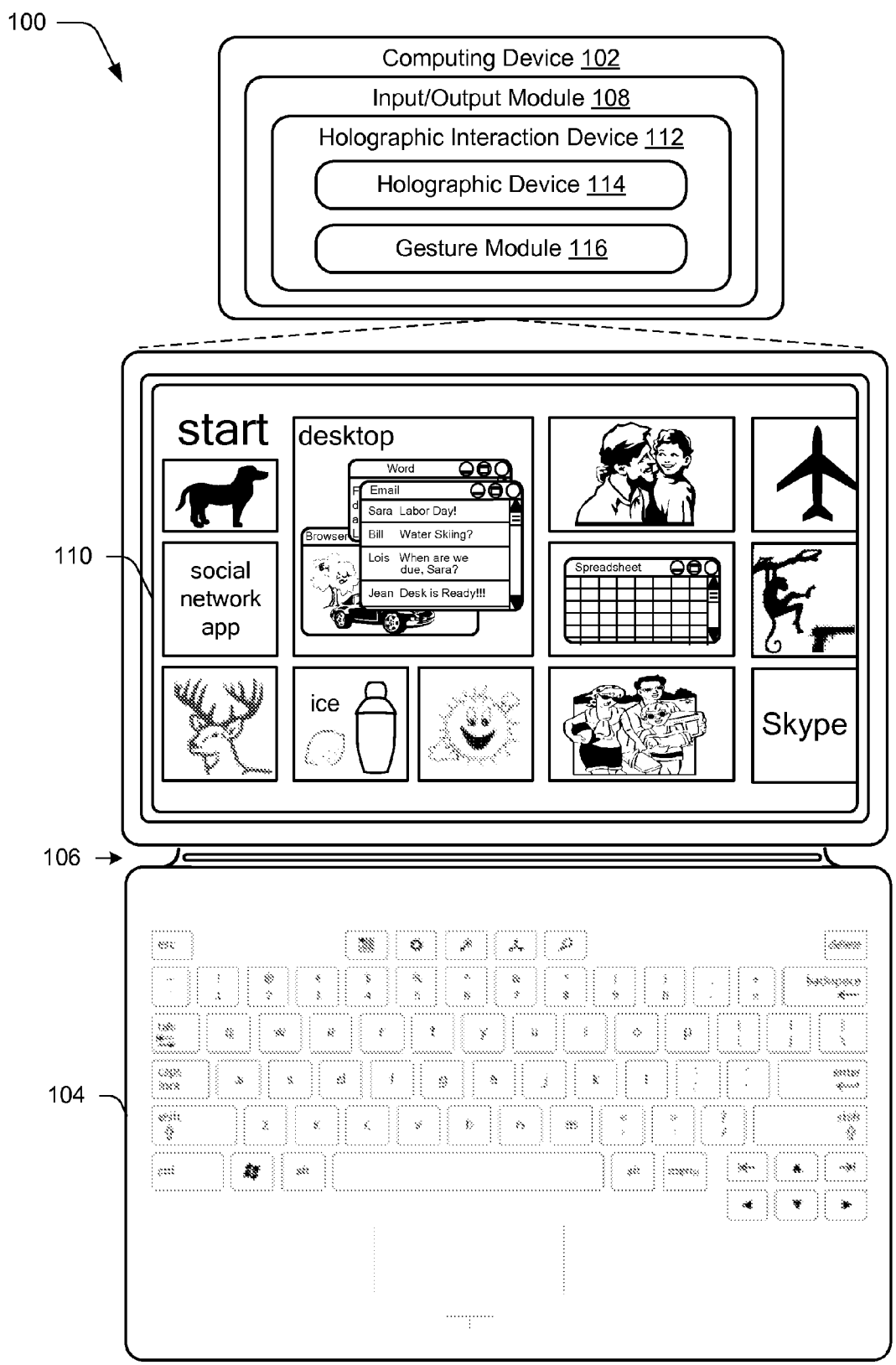
FIG. 1 is an illustration of an environment in an example implementation that is operable to employ the hologram and gesture techniques described herein.

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102 is illustrated as including an input/output module 108. The input/output module 108 is representative of functionality relating to processing of inputs and rendering of outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the input device 104 is configured as having an input portion that includes a keyboard having controls that include a QWERTY arrangement of physical keys and track pad although other arrangements of controls are also contemplated. Other configurations are also contemplated, such as a display that also includes touchscreen functionality (e.g., a capacitive grid of sensors), and so on. Other non-conventional configurations are also contemplated, such as a game controller, configuration to mimic a musical instrument, and so forth. Thus, the input device 104 and controls incorporated by the input device 104 may assume a variety of different configurations to support a variety of different functionality.

As previously described, the input device 104 is physically and communicatively coupled to the computing device 102 in this example through use of a flexible hinge 106, although other examples are also contemplated that include a communicative but not a physical coupling. The flexible hinge 106 in this example is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

The flexible hinge 106, for instance, may be formed using one or more layers of fabric and include conductors formed as flexible traces to communicatively couple the input device 104 to the computing device 102 and vice versa. This communication, for instance, may be used to communicate a result of a key press to the computing device 102, receive power from the computing device, and so on.

The input/output module 108 is illustrated in this instance as including a holographic interaction device 112. The holographic interaction device 112 is representative of functionality to leverage a hologram generated by a holographic device 114 to indicate availability of gestures for interaction with the computing device 102. For example, the holographic interaction device 112 may employ a gesture module 116 that is configured to detect objects that are proximal to the computing device 102 and/or the input device 104. This may include detection of contact on a surface through use of capacitive sensors, strain sensors, acoustic sensors and so on. This may also include detection of proximity but not contact, e.g., image sensors, camera pairs, time-of-flight camera, long range capacitive devices, and so on.

However, as previously described, conventional systems that incorporate these devices typically suffer from the problem that the user has no guide in the space around the device to show the user "what to do." This can be likened to having a keyboard without lettering on it. Accordingly, gestures that are recognizable by these conventional systems may be difficult and even nearly impossible to discover and thus have to be memorized beforehand by a user, e.g., by viewing a tutorial. Thus, in conventional systems the user has to be taught a range of gestures, a kind of computer sign language, to use the device or forgo use of the functionality altogether.

In the illustrated environment, however, the holographic interaction device 112 may employ a hologram output by a holographic device 114 to "clue the user in" regarding how to perform the gesture. In this way, a near-field user interface (NUI) may be supported in which gestures made proximal to but not touching either one of the computing device 102 and/or input device 104 may be used to initiate operations of the computing device 102 using a "legend" output as a hologram that indicates how this interaction is to be performed. An example of this is described as follows and shown in a corresponding figure.

Figure 2:
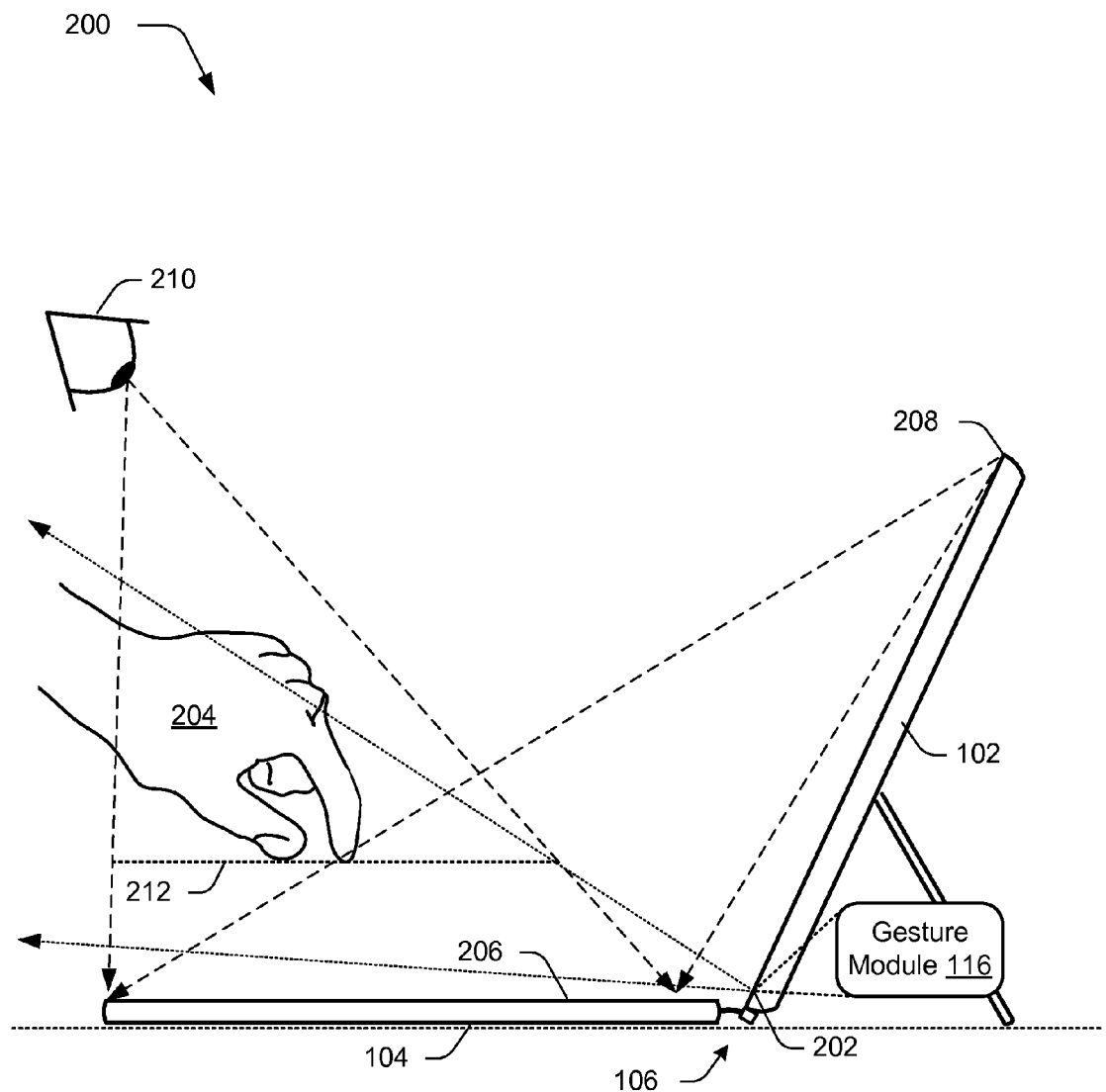
FIG. 2 depicts a system in an example implementation showing a side view of a computing device and an input device of FIG. 1 as outputting a hologram and detecting gestures that are made consistent with the hologram.

FIG. 2 depicts a system 200 in an example implementation showing a side view of the computing device 102 and input device 104 of FIG. 1 as outputting a hologram and detecting gestures that are made consistent with the hologram. In this example, the computing device 102 includes one or more sensors 202 that are configured to support interaction with a near-field user interface. For example, the one or more sensors may be leveraged by the gesture module 116 to identify gestures and cause operations to be performed that correspond to the gestures, and so on. The inputs may be detected by the sensors 202 for processing by the gesture module 116 in a variety of different ways.

For example, the gesture module 116 may be configured to receive one or more inputs via touch interaction with a hardware device, such as a keys of the input device 104 as shown in FIG. 1. Touch interaction may involve pressing a button, moving a joystick, movement across a track pad, use of a touch screen of the display device 110 (e.g., detection of a finger of a user's hand or a stylus), and so on. Recognition of the touch inputs may be leveraged by the gesture module 116 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102), and other devices that involve touch on the part of a user or object.

The gesture module 116 may also be configured to support a near field user interface (NUI, also referred to as a natural user interface) that may recognize interactions that do not involve touch. For example, the computing device 102 may include sensors 202 that are configured to detect inputs without having a user touch a particular device. The gesture module 116 may be configured to support recognition of gestures, presented objects, images, and so on through configurations of the sensors 202 as image sensors, long range capacitive sensors, and so on.

A camera, for instance, may be configured to include multiple lenses so that different perspectives may be captured and thus determine depth. The different perspectives may be used to determine a relative distance from the sensors 202 and thus a change in the relative distance. The different perspectives may be leveraged by the gesture module 116 as depth perception. The images may also be leveraged by the gesture module 116 to provide a variety of other functionality, such as techniques to identify particular users (e.g., through facial recognition), objects, and so on.

The gesture module 116, for instance, may be configured to perform skeletal mapping along with feature extraction of particular points of a human body (e.g., 48 skeletal points) to track one or more users (e.g., four users simultaneously) to perform motion analysis. For example, the sensors 202 may capture images that are analyzed by the gesture module 116 to recognize one or more motions made by a user, including what body part is used to make the motion as well as which user made the motion. An example is illustrated through recognition of positioning and movement of one or more fingers of a user's hand 204 and/or movement of the user's hand 204 as a whole. The motions may be identified as gestures by the gesture module 116 to initiate a corresponding operation. Other examples and positioning of the sensors 202 are also contemplated, such as use of time-of-flight cameras, structured illumination devices, long range capacitive devices, and so forth.

A variety of different types of gestures may be recognized, such a gestures that are recognized from a single type of input (e.g., a motion gesture) as well as gestures involving multiple types of inputs, e.g., a motion gesture and an object gesture made using an object such as a stylus. Thus, the gesture module 116 may support a variety of different gesture techniques by recognizing and leveraging a division between inputs. It should be noted that by differentiating between inputs in the near-field user interface (NUI), the number of gestures that are made possible by each of these inputs alone is also increased. For example, although the movements may be the same, different gestures (or different parameters to analogous commands) may be indicated using different types of inputs. Thus, the NUI input module 114 may provide a natural user interface that supports a variety of user interaction's that do not involve touch.

Accordingly, although the following discussion may describe specific examples of gestures, in instances different types of inputs may also be used without departing from the spirit and scope thereof, e.g., contact versus non-contact. Accordingly, although in instances in the following discussion the gestures are illustrated as being input using a NUI, the gestures may be input using a variety of different techniques by a variety of different devices, such as to employ touchscreen functionality of a tablet computer.

As previously described, conventional systems that incorporated gesture functionality typically suffered from an inability to inform a user regarding what functionality is available via a gesture. This includes how to make a gesture as well as what operation is to be performed responsive to the gesture. Thus, a user of conventional systems is forced to learn a type of sign language to use these gestures.

However, in this example the system 200 is configured to support use of a hologram that may be configured to assist a user in recognizing and performing gestures to initiate operations of the computing device. For example, the holographic device 114 of FIG. 1 may be implemented using a holographic recording mechanism 206 and a light source 208. The light source 208 is positioned is emit light onto the holographic recording mechanism 206 to cause output of a hologram as further described below. The light source 208 may be configured in a variety of ways, such as a laser including semiconductor or diode laser, light emitting diode (LED), and so on that may be configured to emit visible and/or nonvisible light that causes output of a hologram that is viewable by a human eye 210.

The holographic recording mechanism 206 may also be configured in a variety of ways. For example, the holographic recording mechanism 206 in the illustrated instance is configured as a film (e.g., a transparent medium including a silver halide photographic emulsion or photopolymer layer) that is disposed over an input portion of the input device 104, e.g., over one or more of the keys, track pad, and other parts of the input portion that do not include controls as illustrated in FIG. 1. The holographic recording mechanism 206 is configured to record the phase of an optical field of an original object in an image scene. For example, the holographic recording mechanism 206 is configured as a recording of information regarding a light field as captured from an original scene scattered in a range of directions. Thus, the holographic recording mechanism 206 may support a three-dimensional output that is viewable by a user.

In response to light emitted by the light source 208, the holographic recording mechanism 206 may cause output of a hologram that is viewable to the human eye 210, e.g., an eye of a user that is making the gesture using their hand 204 in this example. Thus, the hologram may be configured as a "floating graphic" of the object captured by the holographic recording mechanism 206.

For example, the light source 208 may be configured as an LED or laser diode to provide illumination that is used to reconstruct the hologram. A green laser, for instance, may be used to record a hologram as part of the holographic recording mechanism 204 and a green LED may be used as the light source 208 to reconstruct the hologram. The light source 208 is situated above an interaction plane 212 that is used to display the hologram in this example, which is illustrated along a top edge above a display device 110 of the computing device 102 in this example, with other arrangements also contemplated.

In the illustrated instance, the hologram is a "front-of-screen hologram", which may be constructed in a variety of ways. An example of this is called an "H1/H2" process, which involves recording a light field of an original graphic, reversing it, and then making another recording of this light field from the reversed graphic. The result is a front-of-screen image that is reconstructed by a light source 208 that is placed in the vicinity of the original recording laser, and is of similar wavelength. An example of a hologram as displayed over an input portion of the input device 104 is described as follows and shown in a corresponding figure.

Figure 3:
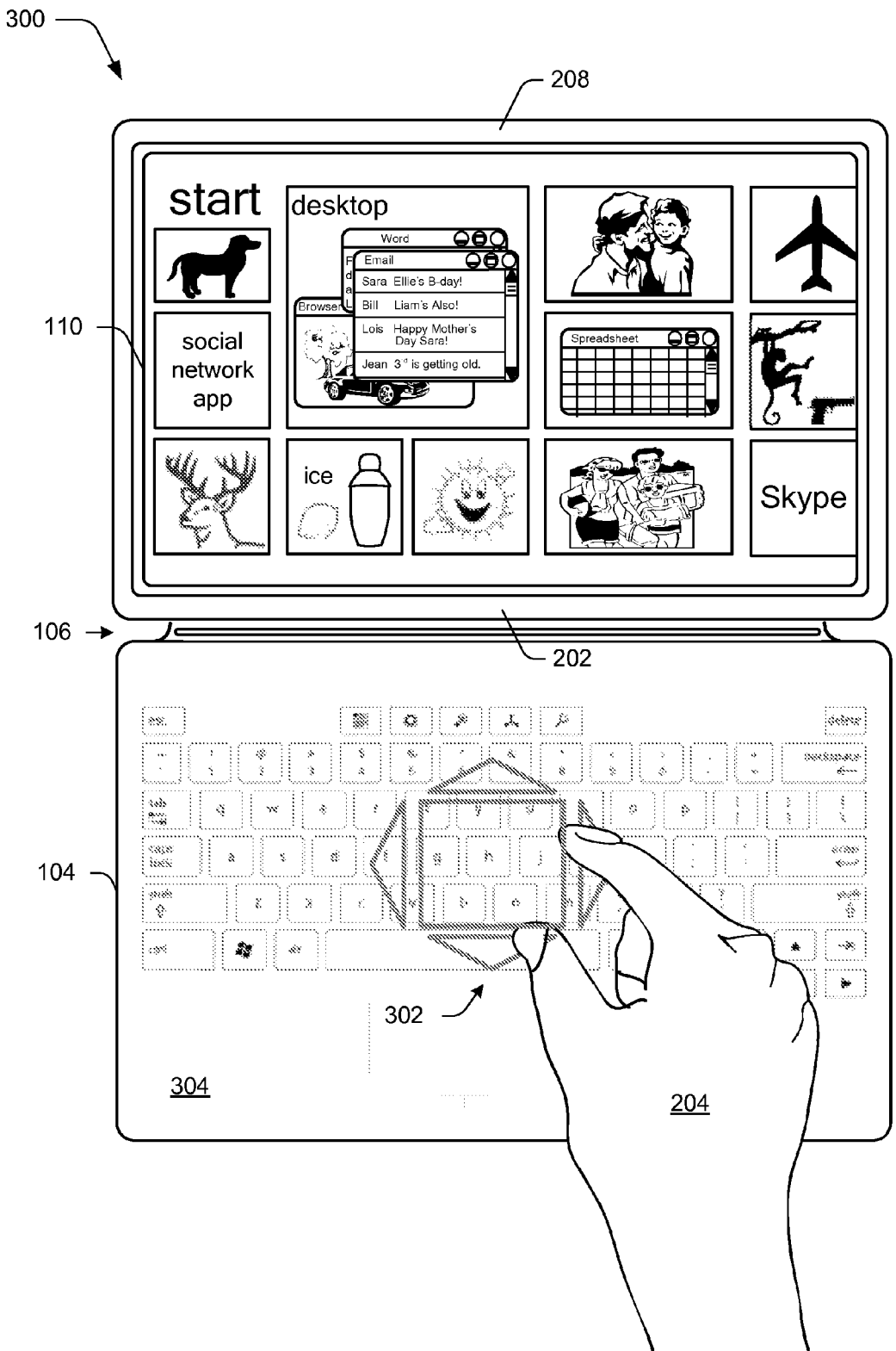
FIG. 3 is an illustrated of an example in which sensors are configured to detect a position of a tip of a user's finger and initiate an operation associated with a virtual "button" of a hologram.

FIG. 3 depicts an example 300 of a hologram 302 as being displayed over an input portion of an input device 104 by a holographic interaction device 112 of FIG. 1. In the illustrated example, the hologram 302 is displayed as a control that is configured to support navigation through the user interface displayed by the display device 110 of the computing device. Thus, in this example the hologram 302 acts as a guide (e.g., legend) that hovers in the space above the input portion that indicates where gestures are to occur that are recognizable by a gesture module 116 of the computing device.

In this way, a NUI interface may be supported that in addition to sensing the user's actions, also provides a guide to show the user where the interaction is to occur. Thus, a variety of touch sensitive input mechanisms may be supported by the input device (e.g., the keys of the keyboard) with a secondary level of user interaction supported "floating above" a surface of the input device 104.

Continuing with the previous example, the sensors 202 may be configured to measure the position of the fingers of the user's hand 204 in space. This may be performed through configuration of the sensor 208 as a camera pair, a camera with a structured light source, a time-of-flight camera, and so on as previously described. Additionally, for interactions with a relatively close space (e.g., approximately 1-3 inches), capacitive sensors may also function to detect finger position, e.g., through configuration for the input device 104 to include a supplemental display device having touchscreen functionality, as part of the computing device 102 itself, and so on. Other examples are also contemplated, such as a sensor-in-pixel configuration as part of a display device.

As illustrated in the example 300 shown in FIG. 3, for instance, the sensors 202 detect a position of a tip of a user's finger and initiates an operation associated with a virtual "button" of the hologram 302 when the user's fingertip enters the hologram volume associated with the button. Thus, the hologram 302 supplies the "where" the gesture is performed as well as "what" operation is to be initiated in response to the gesture.

The holographic interaction device 112 may also be configured to control when the hologram is displayed. For example, the gesture module 116 may analyze an output of the sensors 202 to determine whether an object is approaching an area in which the hologram 302 is to be displayed (and in which gestures are detectable) and in response cause output of the hologram 302. Likewise, once the user's finger passes fully though the indicated detection region of the hologram 302, the holographic interaction device 112 may cause the holographic device 114 to cease display of the hologram 302. In this way, a user is allowed to interact with controls of the input device 104 (e.g., the keys of the keyboard) without interference by the hologram 302. Further, interference caused by an object to illumination by the light source 208 may be lessened, e.g., the user's hand 204 in blocking light output by the light source 208.

Although displayed "above" a surface of the input device 104, the hologram 302 may also be configured to leverage the controls of the input device 104 as part of this interaction. For example, contact by the fingers of the user's hand 204 to cause pressure to be applied to the surface of the input device 104 through the hologram may function similar to touchscreen functionality of the display device 110.

The hologram 302 may be configured in a variety of different way to define an interaction volume (e.g., an interaction plane 212 of FIG. 2, a three-dimensional structure, and so on) for use with corresponding gestures. For example, the hologram 302 may be configured as a joystick, keys for a musical keyboard, strings of an instrument, a mouse, secondary keyboard or keypad, or any other input device that may be manipulated using movement or location of an object.

Thus, the hologram 302 may be configured as an aid to gesture detection (e.g., depth sensing). For instance, the hologram may be used to reconstruct a phase of an icon at a recording plane, so the original icon is itself restricted, hovering above the surface. Therefore, if an object is placed in the focal plane of the icon, the icon is seen as projected onto the object. In this way, the hologram acts as a cue of depth for "where" the interaction will be detected.

The hologram 302 and corresponding gesture detection may also be used to add additional interface space. For example, a mobile communications device such as a smart phone or table may utilize the hologram 302 and corresponding gesture to add number keys or "f-keys" instead of assigning multiple functions to keys as is done on a conventional keyboard. Thus, the hologram 302 may be used to define a "where" and "how" gestures are to be performed that are recognizable by the gesture module 116, e.g., along an interaction plane 212 in FIG. 2. This functionality may be incorporated as part of a wide variety of configurations of the input device 104, an example of which involving a pressure sensitive key is described as follows and shown in a corresponding figure.

Figure 4:
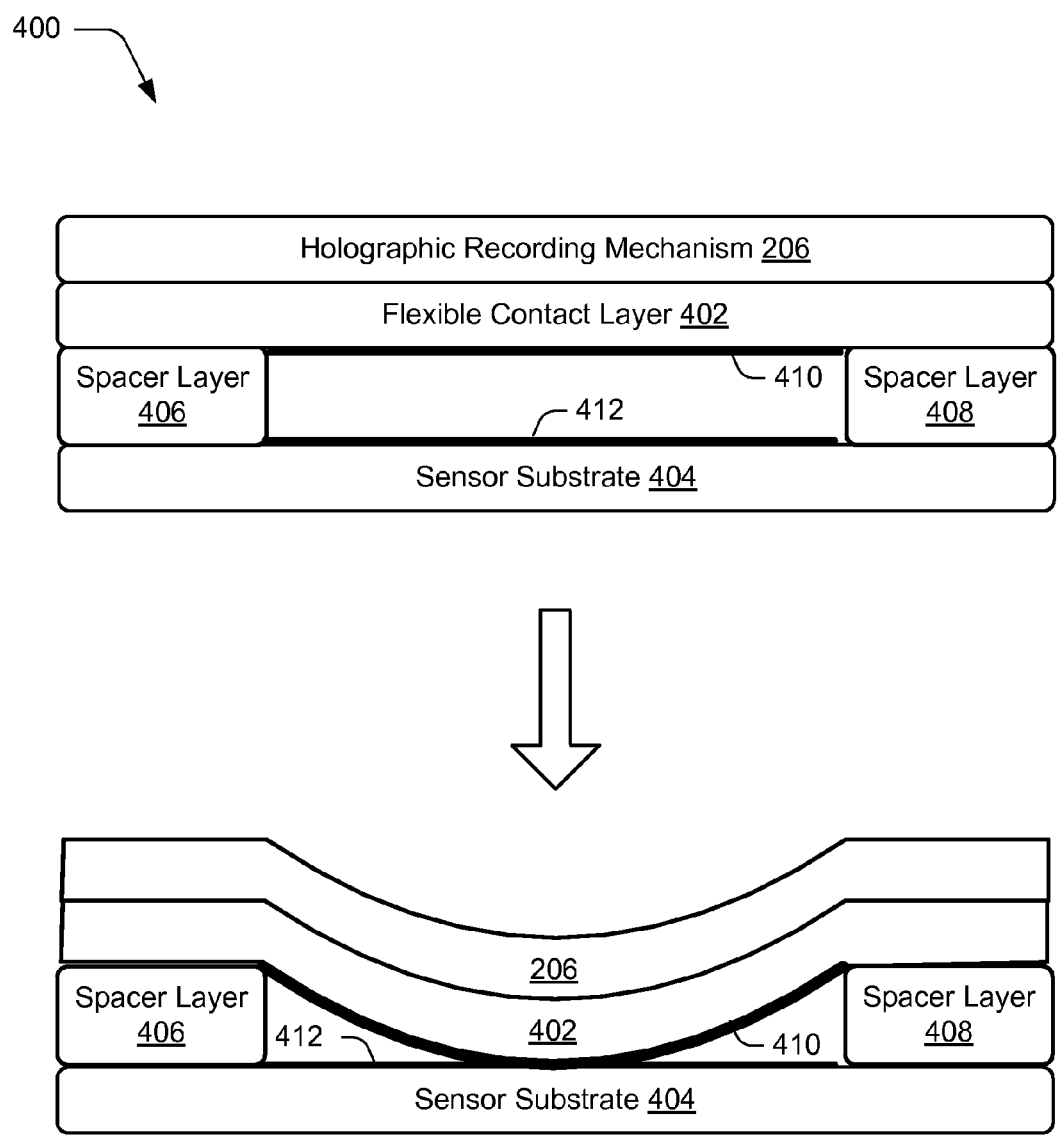
FIG. 4 depicts an example of a cross-sectional view of a pressure sensitive key of a keyboard of the input device of FIG. 1 as including a holographic recording mechanism of FIG. 2.

FIG. 4 depicts an example of a cross-sectional view of a pressure sensitive key 400 of a keyboard of the input device 104 of FIG. 1 as including a holographic recording mechanism 206 of FIG. 2. The pressure sensitive key 400 in this example is illustrated as being formed using a flexible contact layer 402 (e.g., Mylar) that is spaced apart from the sensor substrate 404 using a spacer layer 406, 408, which may be formed as another layer of Mylar, formed on the sensor substrate 404, and so on. In this example, the flexible contact layer 402 does not contact the sensor substrate 404 absent application of pressure against the flexible contact layer 402.

The flexible contact layer 402 in this example includes a force sensitive ink 410 disposed on a surface of the flexible contact layer 402 that is configured to contact the sensor substrate 404. The force sensitive ink 410 is configured such that an amount of resistance of the ink varies directly in relation to an amount of pressure applied. The force sensitive ink 410, for instance, may be configured with a relatively rough surface that is compressed against the sensor substrate 404 upon an application of pressure against the flexible contact layer 402. The greater the amount of pressure, the more the force sensitive ink 410 is compressed, thereby increasing conductivity and decreasing resistance of the force sensitive ink 410. Other conductors may also be disposed on the flexible contact layer 402 without departing form the spirit and scope therefore, including other types of pressure sensitive and non-pressure sensitive conductors.

The sensor substrate 404 includes one or more conductors 412 disposed thereon that are configured to be contacted by the force sensitive ink 410 of the flexible contact layer 402. When contacted, an analog signal may be generated for processing by the input device 104 and/or the computing device 102, e.g., to recognize whether the signal is likely intended by a user to provide an input for the computing device 102. A variety of different types of conductors 412 may be disposed on the sensor substrate 404, such as formed from a variety of conductive materials (e.g., silver, copper), disposed in a variety of different configurations, and so on.

The holographic recording mechanism 206 is illustrated in this example as disposed proximal (in this instance contacting and secured by) the flexible contact layer 402 of the pressure sensitive key 400. The holographic recording mechanism 206 includes a transparent surface that is configured to receive contact and permit flexing as shown in FIG. 4 as well as having a configured to protect against exposure to fingerprints and scratching, e.g., on the fingers of the user's hand 204 of FIG. 2.

The holographic recording mechanism 206 is formed as a film that includes a layer of material (e.g., silver halide) that is configured to record the phase of an optical field of the original object that is to serve as the hologram 302 of FIG. 3. Although a single layer and single hologram were described in the previous examples, multiple layers may be employed to support multiple holograms, an example of which is described as follows and shown in a corresponding figure.

Figure 5:
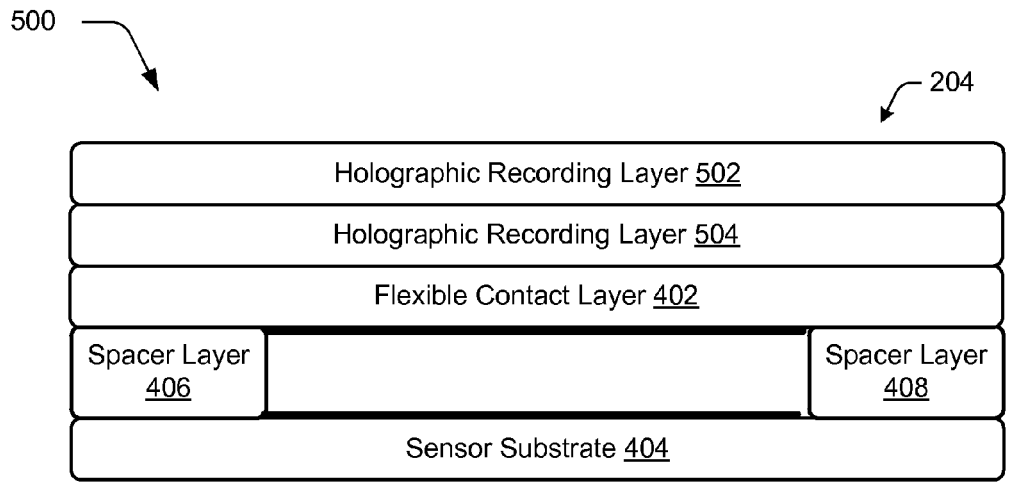
FIG. 5 depicts a pressure sensitive key as including a holographic recording mechanism having multiple layers.

FIG. 5 depicts a pressure sensitive key 500 as including a holographic recording mechanism 204 having multiple layers. In this example, the holographic recording mechanism 206 includes a plurality of holographic recording layers 502, 504. Each of these layers are configured to support output of different holograms in response to different wavelengths of light.

Additionally, a single holographic recording layer may be configured to record multiple holographic images that may be addressed by illumination from different angles, different wavelengths, and so on. This allows the hologram to support multiple colors and even support dynamic output by switching light sources. For example a green track-pad icon could have the buttons go red when "touched" to provide user feedback.

As the hologram is tuned to a specific light source wavelength and position, it does not in general act as a filter, so a legend or secondary display may be placed under it to indicate a conventional keypad or touchscreen, as shown in FIG. 3. Thus, different holograms may be displayed at different times by altering a light source, an example of which is described as follows and shown in a corresponding figure.

Figure 6:
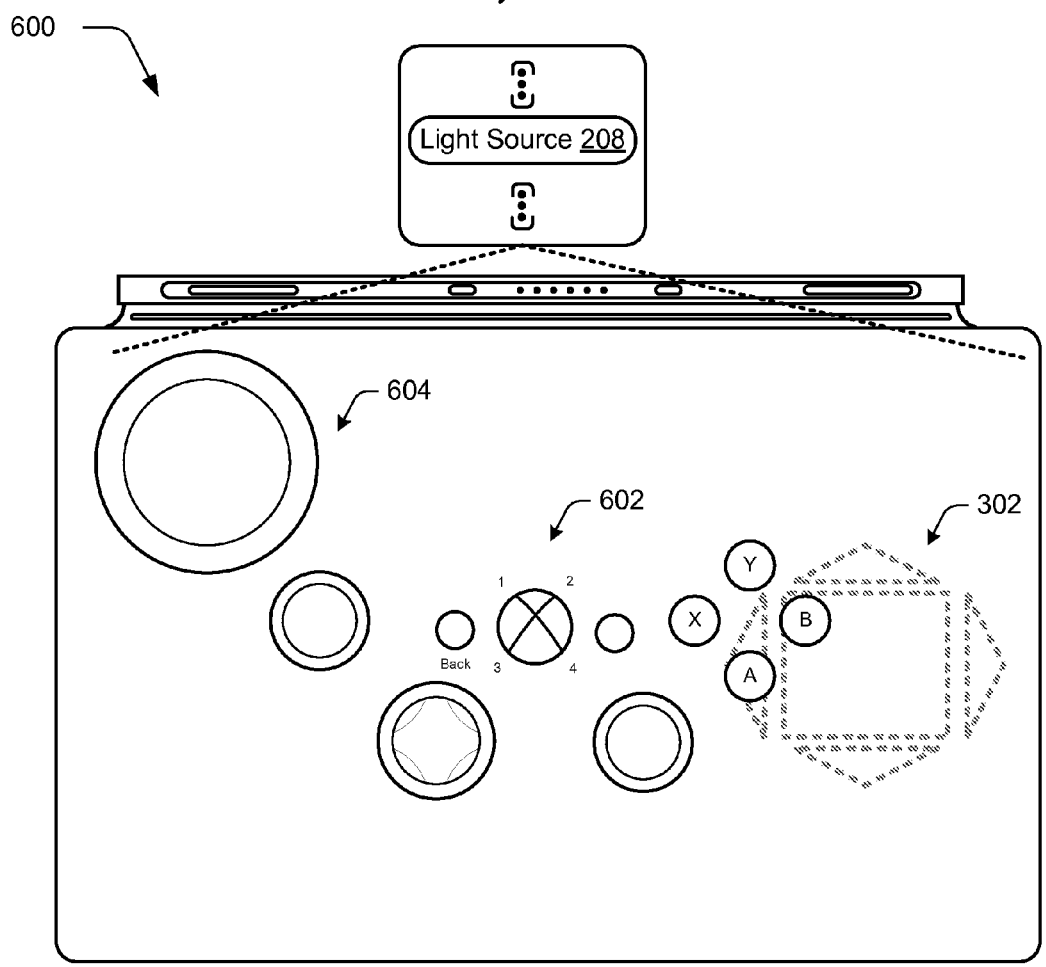
FIG. 6 depicts an example of a system in which multiple holograms are displayable based on alterations made to one or more light sources.

FIG. 6 depicts an example of a system 600 in which multiple holograms are displayable based on alterations made to one or more light sources 208. In this example, holograms are displayed of a game controller 602 and radial dial 604 that are usable to indicate supported interactions. The holograms may be displayed "above" the input device 104 as previously described as well as at a surface of the input device 104, e.g., for use in conjunction with a pressure sensitive key, capacitive surface, and so on.

As previously described, output of a hologram may be tuned to a specific light source 208 wavelength and position and therefore output of the holograms may be altered as desired. For example, display of the hologram 302 previously described in relation to FIG. 3 may be prevented until an application having navigation functionality is executed by the computing device, which is shown through the use of phantom lines in the example.

A variety of different functionality may be supported by the holograms. For instance, depending upon the recording geometry, the hologram may have a limited field of view. If the hologram cannot be seen from the side, it can also be used as a security device, e.g., as an invisible floating keypad, for entering a PIN or gesture password where a person standing next to the user cannot see the "keys" being pressed, and so on. Additionally, a hologram may be used to create the effect of a user interface that "pops up". If the hologram has underneath it a display showing the icon that is on the hologram, and the reconstruction source is initially turned off, the icon can be animated to make it look like it is flipping upwards as the hologram is turned on.

A variety of different techniques may be leverage this functionality previously described. For example, situations may be encountered in which physical touching of a surface is to be avoided, such as for cooking, "dirty" jobs such as gardening or car maintenance, and so on. Although a pressure sensitive key was described in the previous examples, a variety of different input devices having a variety of different controls may leverage the holographic interaction device techniques described herein, e.g., a display device having touchscreen functionality, a game controller, and so on. Further, these techniques may be employed as part of an interchangeable surface, further discussion of which may be found as follows.

Figure 7:
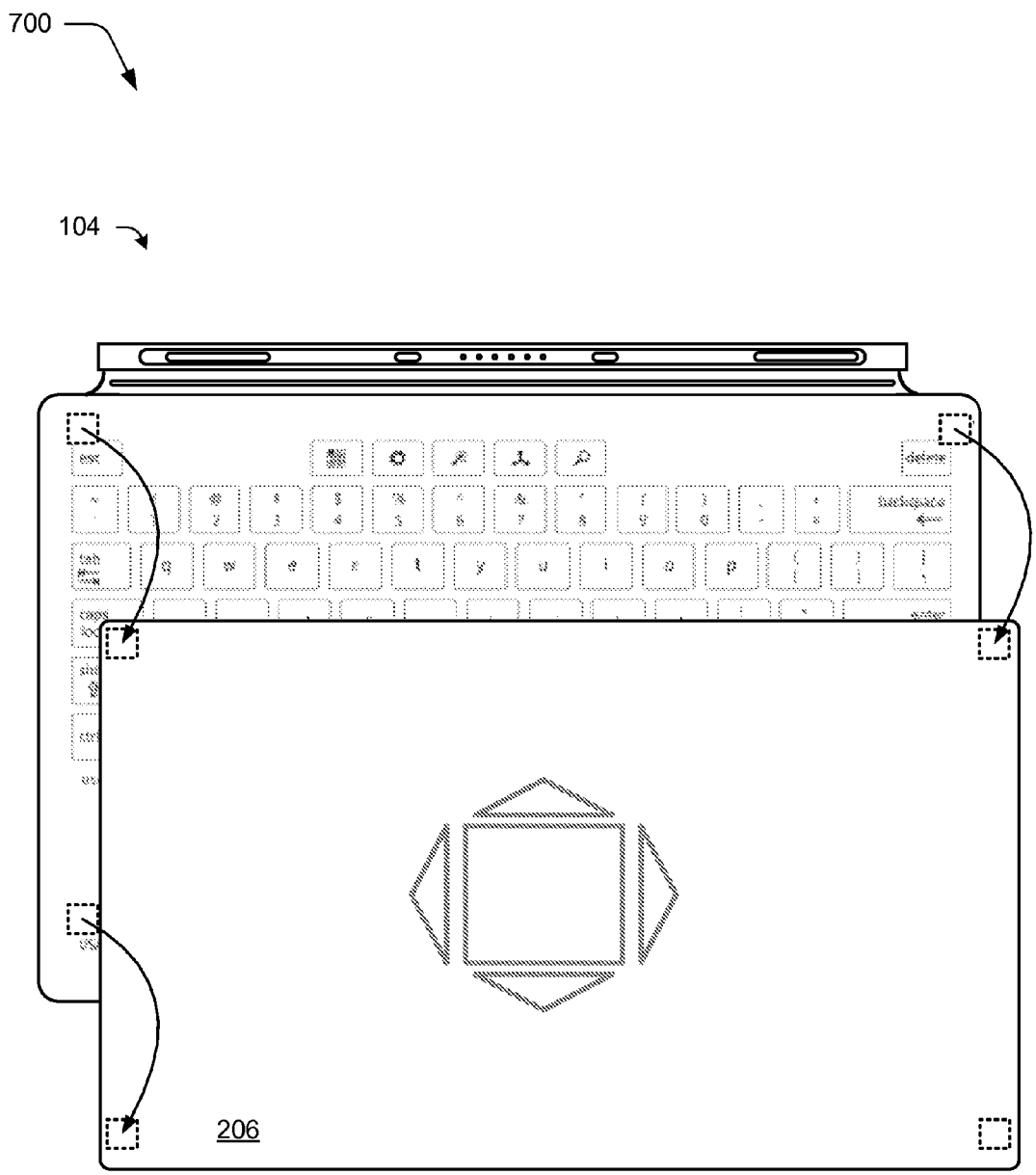
FIG. 7 depicts an example implementation in which the holographic recording medium is included as part of an interchangeable surface.

FIG. 7 depicts an example implementation 700 in which the holographic recording medium 206 is included as part of an interchangeable surface. In this example, the input device 104 is illustrated as having an interchangeable surface that includes the holographic recording medium 206 and thus is usable to cause output of the hologram used for navigation as shown in the figure.

The interchangeable surface is connectable physically to the input device 104 and in this instance is illustrated as at least partially transparent such that indication of input (e.g., controls) may be viewed through the surface. In this way, a variety of different interchangeable surfaces having differing holograms stored thereon may be utilized and mapped to provide a variety of different functionality to a user from a single input device, such as a game controller, music player, keyboard, and so on as shown in FIG. 6.

The holographic recording medium 206 is illustrated as being removably secured to a base of the input device 104 through use of a securing mechanism shown in phantom in the figure. The securing mechanism may be configured in a variety of ways, such as one or more magnets, use of a raised border that is configured to fit into a complimentary slot to aid mechanical alignment and securing of the base and surface to each other, electrostatic techniques, a mechanical locking device, and so on. In this way, the holographic recording mechanism 206 may be "changed out" with other holographic recording mechanism to support output of desired holograms in an efficient and cost effective manner, e.g., without specially configured the input device 104 as a whole.

Example System and Device

Figure 8:
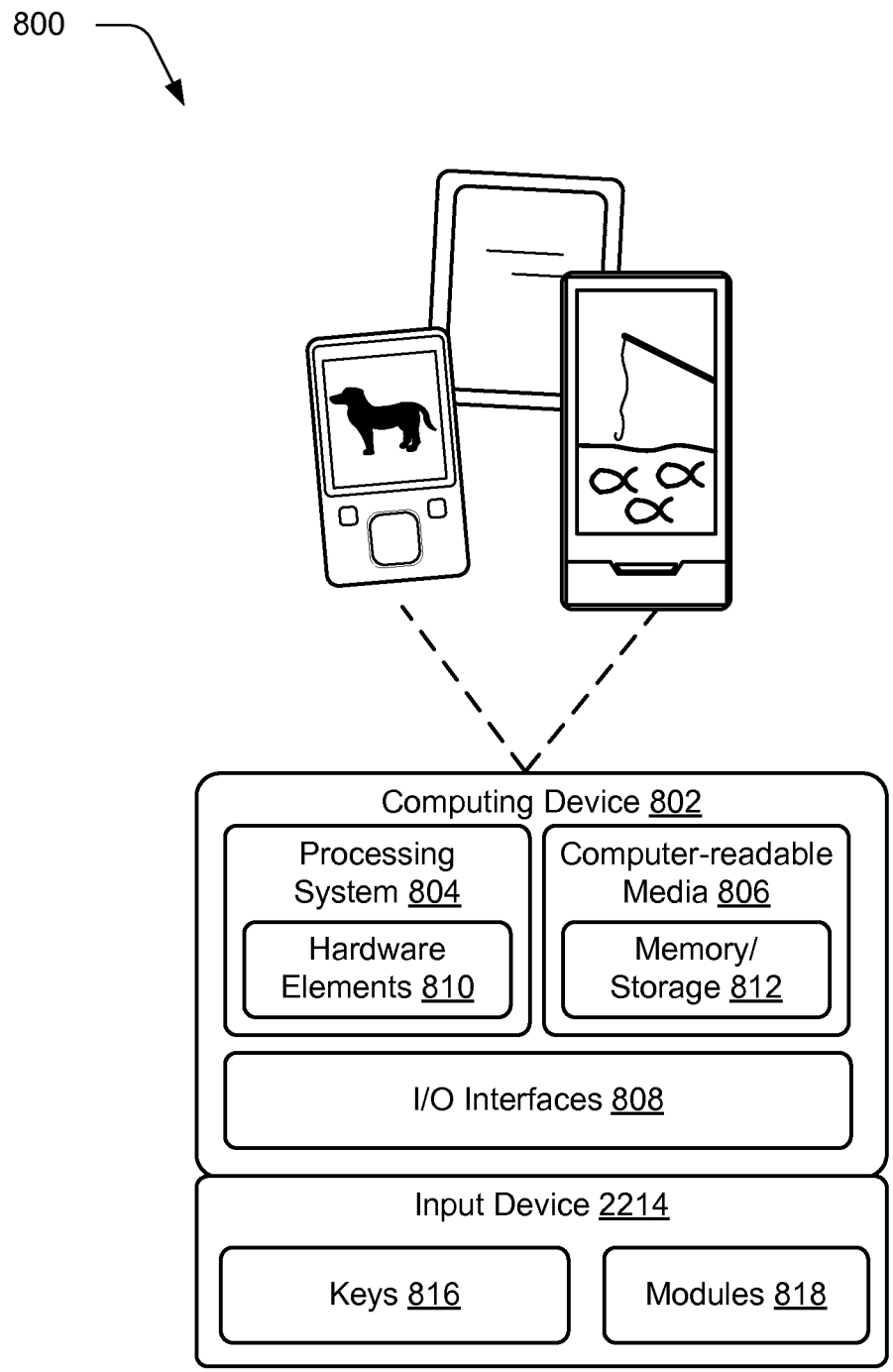
FIG. 8 illustrates an example system including various components of an example device that can be implemented as any type of computing device as described with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. The computing device 802 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways to support user interaction.

The computing device 802 is further illustrated as being communicatively and physically coupled to an input device 814 that is physically and communicatively removable from the computing device 802. In this way, a variety of different input devices may be coupled to the computing device 802 having a wide variety of configurations to support a wide variety of functionality. In this example, the input device 814 includes one or more keys 816, which may be configured as pressure sensitive keys, mechanically switched keys, and so forth.

The input device 814 is further illustrated as include one or more modules 818 that may be configured to support a variety of functionality. The one or more modules 818, for instance, may be configured to process analog and/or digital signals received from the keys 816 to determine whether a keystroke was intended, determine whether an input is indicative of resting pressure, support authentication of the input device 814 for operation with the computing device 802, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An input device comprising:
   an input portion comprising a plurality of controls that are configured to detect contact by a user with a surface of the input device to generate signals to be processed as inputs by a computing device that is communicatively coupled to the controls; and
   a holographic layer disposed over a surface of the input portion and formed as an interchangeable surface that is configured to be removably attached to the input portion, the holographic layer configured to output a hologram in response to receipt of light, from a light source, as viewable by a user over the input portion, the hologram utilized to indicate gestures that are available for recognition by the input device and the hologram utilized to indicate how to perform the gestures.

2. An input device as described in claim 1, wherein the plurality of controls include keys of a keyboard or a touchscreen.

3. An input device as described in claim 1, wherein the holographic layer is formed as a film that is secured to the surface.

4. An input device as described in claim 1, wherein the holographic layer is formed over one or more of the plurality of controls.

5. An input device as described in claim 1, wherein the hologram is viewable over one or more of the plurality of controls.

6. An input device as described in claim 1, wherein the removable attachment supports replacement of the holographic layer with a different holographic recording mechanism.

7. An input device as described in claim 1, wherein the hologram defines an interaction volume that includes the hologram above the surface of the input device, with which, a user is to interact to cause performance of one or more operations by the computing device.

8. An input device as described in claim 7, further comprising at least one sensor configured to detect interaction by a user in relation to the interaction volume, from which, one or more gestures are recognizable by the computing device to initiate the performance of the one or more operations by the computing device.

9. An input device as described in claim 7, wherein the interaction of the user is detectable to control display of the hologram based on proximity of an object to the interaction plane.

10. An input device as described in claim 1, further comprising another holographic layer that is configured to display another hologram.

11. An input device as described in claim 10, wherein the holographic layer and the other holographic layer are configured to form respective holograms using different wavelengths of light, one to another.

12. A method comprising:
    causing display of a hologram by a computing device, the hologram indicating how one or more gestures are to be performed by a user to interact with the computing device;
    recognizing the one or more gestures by the computing device from an input detected using one or more sensors of the computing device;
    responsive to the recognizing, initiating performance of one or more operations by the computing device that correspond to the recognized one or more gestures, respectively; and
    tracking a likely position of a viewer of the hologram and configuring the hologram based at least in part on the tracking.

13. A method as described in claim 12, wherein the hologram is configured as a control that is manipulable by a user.

14. A method as described in claim 12, wherein the one or more gestures are detectable by the one or more sensors computing device without involving contact with the computing device.

15. A system comprising:
    an input device having an input portion comprising a plurality of controls that are configured to generate signals and a holographic recording mechanism disposed over a surface of the input device and formed as an interchangeable surface that is configured to be removably attached to the input portion; and
    a computing device that is communicatively coupled to the input device to receive and process the generated signals as inputs, the computing device including a light source configured to cause the holographic recording mechanism to expose a hologram that is viewable by a user, the hologram indicating how one or more gestures are to be performed by the user to interact with the input device.

16. A system as described in claim 15, wherein the computing device further comprises one or more sensors that are configured to detect gestures made through interaction with a hologram formed using the holographic recording mechanism.

17. A system as described in claim 15, wherein the interaction of the user is detectable by the computing device without involving contact by the user with the computing device.

18. A system as described in claim 15, further comprising another holographic recording mechanism that is configured to display another hologram, the holographic recording mechanism and the other holographic recording mechanism being formed as layers.

19. An input device as described in claim 15, further comprising another holographic recording mechanism that is configured to display another hologram, the holographic recording mechanism and the other holographic recording mechanism being configured to form respective holograms using different wavelengths of light, one to another.

20. An input device as described in claim 15, wherein the holographic recording mechanism is formed as at least one film.

* * * * *